UNITED STATES PATENT OFFICE.

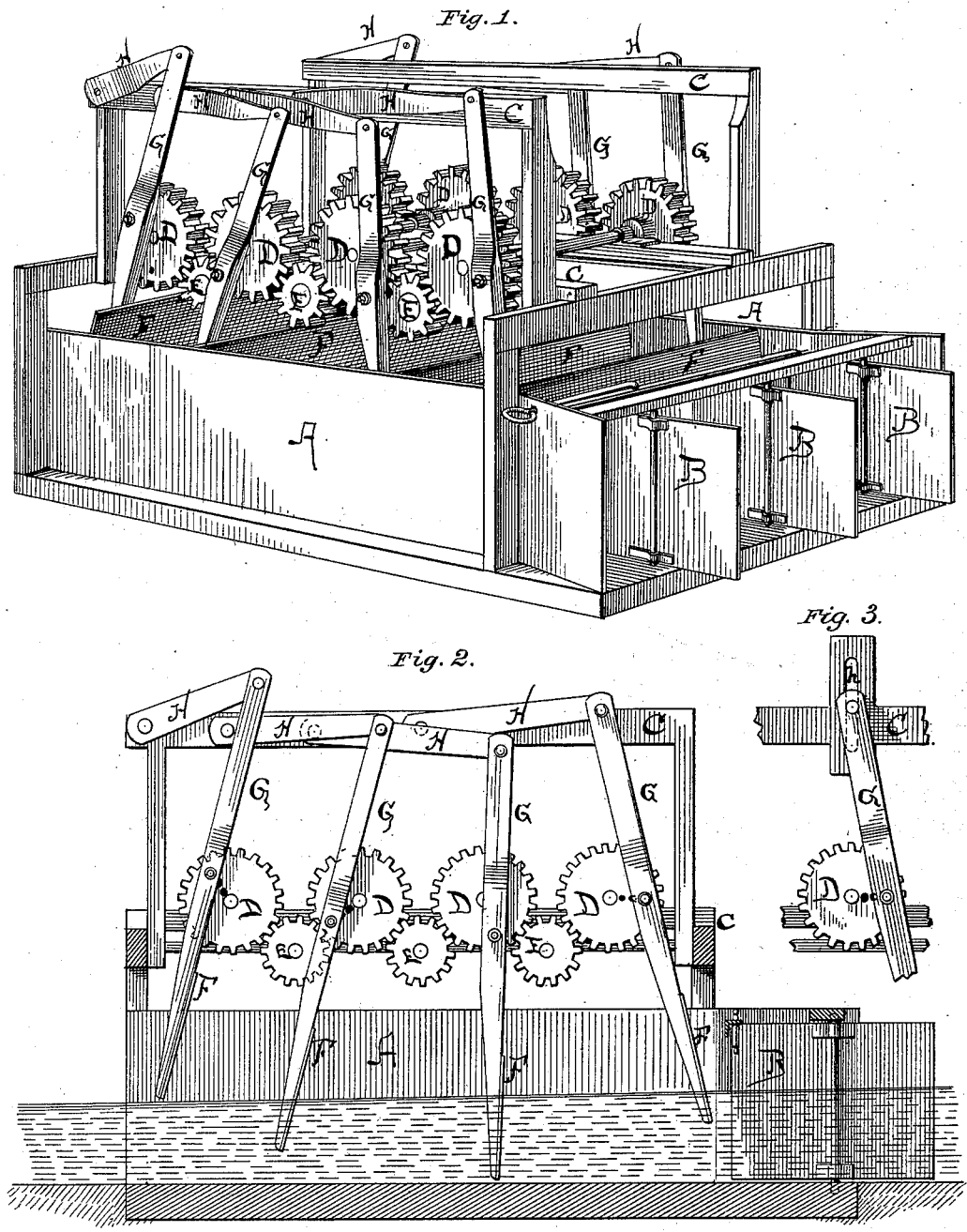

WALLACE W. CLEAVELAND, OF MARSHALL, MICHIGAN.

IMPROVEMENT IN CURRENT-MOTORS.

Specification forming part of Letters Patent No. 216,151, dated June 3, 1879; application filed April 28, 1879.

*To all whom it may concern:*

Be it known that I, W. W. CLEAVELAND, of Marshall, in the county of Calhoun, in the State of Michigan, have invented a new and useful Improvement in Current-Motors, of which the following is a full and exact description.

My invention relates to that class of motors which receive their movement from a flowing stream, and are designed to act with the natural current without the intervention of high dams or any artificial means of increasing the force of the flowing stream.

So far as I am aware such motors have heretofore been in the form of revolving wheels, and the necessity of making the blades of said wheels movable upon pivots, so that they may swing upward and present their edges only to the advancing current at one side during their revolution, renders the said wheels liable to derangement; and to obviate the defects named I have devised a series of blades rigidly attached to their arms, operated by series of cranks, so that they may be brought down into the water to a certain distance in the direction of the flowing stream, and then be raised out of the stream and advanced above it to the point where they again enter the stream, whereby there are but few joints in the apparatus, the movements are all positive and direct, and the working parts all capable of being elevated above the stream, so that they are not liable to submergence, obstruction or interruption from any floating matter that may be passing down within the line of the motor.

My invention, therefore consists principally in a water-motor composed of a series of blades set transversely to the line of the current and operated by a series of cranks so as to be alternately dipped into the stream, moved with it, and elevated above it, advanced in a contrary direction, and again dipped into the stream.

That others may fully understand my improvement I will particularly describe it, having reference to the accompanying drawings, wherein—

Figure 1 is a vertical view of my device. Fig. 2 is a side elevation of the same. Fig. 3 represents a modified guide for the wing-arm.

A is the trunk or casing with expanding throat, which I prefer to employ for the purpose of conducting the water in the desired channel, so as to bring it upon the blades of my motor, though it is not necessary that the entire stream should be conducted through said trunk or channel. At the upper end I close said trunk by a series of swinging balanced gates, B, so that the water can be excluded from the motor when it is desired to stop the same, and at such times a side gate might be opened, if necessary, to admit the flow of water outside the trunk. At a proper height above said trunk I construct a frame-work, C, upon which I mount a series of gear-wheels, D, and gear-pinions E meshing therewith and connecting them, so that when motion is imparted to one of said wheels it will be transmitted to said pinions and the other wheels of the series. Said wheels D are arranged in pairs, the wheels of each pair being connected by a shaft. I also provide a series of blades or paddles, F, which in length are nearly equal to the interior width of the trunk A, and they are placed transversely therein.

Each of said blades has attached to it two perpendicular arms, G, one at or near each end of said blades, and said arms are pivoted to the wheels D at a distance from the center of one of the pairs above mentioned, so that when the said wheels D are revolved they will act as cranks for said arms, causing the blades to be elevated and depressed, according as said crank-pivot ascends or descends. At their upper ends said arms G engage with guides, which, in this instance, and as I prefer, are swinging arms or links H, pivoted to an upper longitudinal bar of the frame for the purpose of maintaining the upper end of the arm G in a position substantially vertical to the axis of the wheel D, while permitting said upper end of arm G to rise and fall as the wheel D is revolved.

Instead of the swinging arms H vertical slotted guides *h* might be employed, but they would be more difficult to construct and more liable to derangement than the swinging arms H. I employ as many blades or paddles F as I have wheels D in the series, and the location of the pivot-points upon said wheels are so distributed that no two of said paddles or blades will be in precisely the same position at any one moment of time, and thereby I cause them to be alternate in their action, some of them acting as propellers while others are out of the water and being returned to their position of effectiveness. The number of said blades or paddles may be multiplied indefinitely in accordance with the volume of water passing down the stream or to the power it is desired to transmit therefrom to move the machinery. They may also be made longer or shorter, in accordance with the same consideration, and the diameters of the driving-wheels D, whereby the vertical amplitude of the motion is regulated, may also be in accordance with the depth of water flowing in the stream, or in accordance with its variations in depth during flood. With this motor all of the moving parts, with the exception of the blades themselves, may be so far elevated above the level of the stream that they will never be in danger of submergence, and the amplitude of vertical movement may be made so great that the blades or paddles will be elevated above the surface of the water, however high it may be. This amplitude of motion may also be regulated by adjusting the pivot-connection between the wheels D and the arms G nearer to or farther away from the axis of revolution, as may be desired, the means for obtaining such adjustment being common to mechanical experts, and well understood by every skilled artisan. If, for any reason, it is not desirable to provide for such adjustments, or to provide for extraordinary amplitude of movement, flood-water may be excluded from the trunk A by building its sides sufficiently high, so that no water can enter except through the gates B.

Having described my invention, what I claim as new is—

1. A series of wheels, D, with intermediate transmitting-pinions E, combined with a similar number of blades, F, connected to said wheels by pivots eccentric to their axes, and guides at the upper ends of said arms to permit them to move in lines substantially vertical to the axis of rotation, for the purpose set forth.

2. A trunk and throat, A, provided with a superimposed frame-work, C, combined with a series of wheels, D, mounted in pairs upon shafts, as shown and described, with intermediate transmitting-pinions similarly mounted, and a corresponding number of blades, each provided with two arms, G, correspondingly pivoted to the wheels D of one pair of guides at the upper ends of said arms G, whereby they are permitted to move up and down in lines substantially vertical with the axis of rotation, for the purpose set forth.

3. A series of wheels, D, with intermediate transmitting-pinions E, corresponding series of blades F, with their arms G, pivoted to said wheels D, eccentric to the center of rotation, and swinging guides H, for the purpose set forth.

4. A series of blades, F, with their arms G, with guides at their upper ends, combined with a corresponding series of wheels, D, and a pivotal connection which is radially adjustable as to the axis of rotation, for the purpose set forth.

WALLACE W. CLEAVELAND.

In presence of—
HERBERT E. WINSOR,
THEO. H. COOK.